United States Patent
Davis et al.

(10) Patent No.: US 10,124,369 B1
(45) Date of Patent: Nov. 13, 2018

(54) HANDHELD DEVICE FOR AMBIENT TEMPERATURE 3D SCULPTING

(71) Applicant: GenOne Technologies LLC, Cambridge, MA (US)

(72) Inventors: Christopher Davis, Medford, MA (US); David Orozco, Cambridge, MA (US)

(73) Assignee: GenOne Technologies LLC, Cambridge, MA (US)

( * ) Notice: Subject to any disclaimer, the term of this patent is extended or adjusted under 35 U.S.C. 154(b) by 417 days.

(21) Appl. No.: 14/865,195

(22) Filed: Sep. 25, 2015

Related U.S. Application Data

(60) Provisional application No. 62/055,277, filed on Sep. 25, 2014.

(51) Int. Cl.
| | | |
|---|---|---|
| *A47L 13/32* | (2006.01) | |
| *B05D 7/24* | (2006.01) | |
| *B05D 1/26* | (2006.01) | |
| *B05C 17/005* | (2006.01) | |

(52) U.S. Cl.
CPC .......... *B05D 7/24* (2013.01); *B05C 17/00503* (2013.01); *B05C 17/00523* (2013.01); *B05C 17/00583* (2013.01); *B05D 1/26* (2013.01)

(58) Field of Classification Search
CPC ...... B05D 7/24; B05D 1/26; B05C 17/00503; B05C 17/00523; B05C 17/00583
USPC .................................................. 401/1, 2, 195
See application file for complete search history.

(56) References Cited

U.S. PATENT DOCUMENTS 7,255,825 B2    8/2007 Nielsen et al.

FOREIGN PATENT DOCUMENTS

| CN | 103802320 | 5/2014 |
| CN | 103802321 | 5/2014 |
| CN | 103817937 | 5/2014 |
| WO | WO 01/78969 | 10/2001 |

OTHER PUBLICATIONS

"The 3Doodler", Wobbleworks, Inc., http://the3doodler.com/, accessed Sep. 24, 2014, 5 pages.
"The Smallest 3D Printing Pen in the World", Lix, https://www.kickstarter.com/projects/lix3d/lix-the-smallest-3d-printing-pen-in-the-world, accessed Sep. 24, 2015, 14 pages.

*Primary Examiner* — Jennifer C Chiang
(74) *Attorney, Agent, or Firm* — Sunstein Kann Murphy & Timbers LLP

(57) ABSTRACT

A method of depositing dissoluble solid material onto a substrate includes providing a supersaturated solution including the solid material dissolved in a solvent, flowing the supersaturated solution out of an orifice of a handheld device and onto the substrate, and activating the supersaturated solution, at ambient temperature, so that the supersaturated solution solidifies. A handheld device for depositing the dissoluble solid material is also described.

20 Claims, 11 Drawing Sheets

HANDHELD DEVICE FOR AMBIENT TEMPERATURE 3D SCULPTING

RELATED APPLICATION

This application claims the benefit of U.S. Application No. 62/055,277, entitled "3D Crayon" and filed Sep. 25, 2014, which is hereby incorporated by reference in its entirety.

TECHNICAL FIELD

The present invention relates to a three-dimensional (3D) crayon for use at ambient temperatures, and more particularly to a 3D crayon that uses a supersaturated solution.

BACKGROUND ART

Three-dimensional (3D) fabrication has become an exciting technology in the engineering, scientific, and even the artistic community. There has been a focus on developing 3D printers for both the professional manufacturer, as well as the in-house hobbyist. Although interest in the field has led to the development of different types of inks and printers, many of these devices require some level of technical aptitude (e.g., familiarity with machining techniques, fluency in CAD software used to manipulate 3D models).

Furthermore, some devices melt a plastic and shape the plastic while it is still malleable. As the plastic cools, it hardens. Chinese Patent Nos. 103,802,320 and 103,802,321 describe devices that operate in this manner. Devices that operate in this manner include the 3Doodler, manufactured by Wobbleworks, Inc. of Somerville, Mass. and the Lix 3D Pen, manufactured by Lix of Brussels, Belgium. The devices use an internal heating element, such as a heating coil, to heat up a plastic, such as a thin plastic filament. Users operate the devices to deposit the plastic onto a surface. Thus, the devices melt the plastic and allow the plastic to be formed while it is pliable, but eventually, the plastic cools and hardens into the shape of the user's choosing. These devices present a number of complications. As the plastic hardens, the plastic may clog the device's aperture and render it inoperable. To heat the plastic, the devices must be equipped with or have ready access to an energy source to operate the heating element. Additionally, the high temperatures emitted from heating elements may pose inherent safety risks to users.

Other 3D printing devices deposit inks that are curable by ultraviolet light, such as the CreoPop manufactured by CreoPop of Singapore. Once a device deposits the ink, the user activates the device's ultraviolet light to cure the ink. However, not only does the ultraviolet light add to the complexity and cost of the device, regular exposure to ultraviolet light may pose safety risks to users. Additionally, the UV-curable resins limit the chemistries that may be used in the product.

WO 2001078969 and EP 1,272,334 mention the usage of supersaturated solutions with respect to three-dimensional inkjet printing. However, in these devices, the solutions act specifically as a binder for granting additional stability to pre-existing 3D structures made of resin. Additionally, inkjet printing typically requires a pressure differential to spray material onto a substrate, which usually requires an external source of power (e.g., pump power provided through electricity).

Supersaturated solutions are used in some industrial applications. For example, in the pharmaceutical industry, supersaturated solutions have been used to administer precise dosages of water-insoluble drugs. These drugs are dissolved in non-aqueous solutions and then meted out for ingesting. In the food industry, supersaturated solutions are used to create some confectionaries. For example, supersaturated sugar solutions are heated and then cooled until the solutions crystallize to form rock candy. Such supersaturated solutions are also used as food additives.

SUMMARY OF THE EMBODIMENTS

In accordance with one embodiment of the invention, a method of depositing dissoluble solid material onto a substrate includes providing a supersaturated solution including the solid material dissolved in a solvent. The method also includes flowing the supersaturated solution out of an orifice of a handheld device and onto the substrate. The method also includes activating the supersaturated solution, at ambient temperature, so that the supersaturated solution solidifies.

Activating the supersaturated solution may include providing a nucleation site for the supersaturated solution, and contacting the nucleation site with the supersaturated solution. Activating may include contacting the supersaturated solution with a seed material, such as dust, salt, or a piece of the solid material. In some embodiments, activating the supersaturated solution includes applying a force to the supersaturated solution.

Flowing the supersaturated solution out of the orifice of the handheld device includes opening a valve between a chamber containing the supersaturated solution and the orifice of the handheld device, and propelling the supersaturated solution from the chamber through the orifice. Propelling the solution may include applying a force to a housing of the handheld device.

In some embodiments, the handheld device includes a chamber containing the supersaturated solution, and the method also includes applying heat to the chamber to melt solidified supersaturated solution.

In accordance with another embodiment of the invention, a handheld device is used for depositing dissoluble solid material onto a substrate. The device includes a chamber configured to contain a supersaturated solution that solidifies when activated. The chamber also maintains the supersaturated solution as a liquid in the chamber. The device also includes a housing that holds the chamber. The housing includes an orifice through which the supersaturated solution flows at ambient temperature.

The chamber may include a smooth inner surface that maintains the supersaturated solution as a liquid, and the smooth inner surface may include polystyrene, acrylonitrile butadiene styrene, polypropylene, silicone, a hydrophobic liquid, or a combination thereof. The housing may include a thin, flexible material so that pressure applied to the housing propels the supersaturated solution in the chamber to flow through the orifice. The housing may include a thermoplastic material, a polytetrafluoroethylene material, a low density polyethylene, or a combination thereof. The housing may be configured as a scribing device.

The device may also include a valve located between the chamber and the orifice of the handheld device. The valve may be configured to control the rate of flow of the supersaturated solution from the chamber through the orifice. The valve may include a lever and a pivot. The device may also include a heat source configured to apply heat to the chamber for melting solidified supersaturated solution, as well as a cooling system, proximate to the orifice of the housing, that cools the supersaturated solution to ambient temperature as the solution flows out of the housing. In these embodiments, the chamber may be coated with a thermally conductive material, such as metal.

The device may also include a pressure valve to regulate the pressure of the supersaturated solution within the chamber.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Definitions. As used in this description and the accompanying claims, the following terms shall have the meanings indicated, unless the context otherwise requires:

A "supersaturated solution" is a solution whose concentration of solute exceeds the concentration normally achieved at ambient temperature. In many embodiments, a supersaturated solution is created by heating or cooling a solvent, dissolving a solute in the solvent, and returning the solution to a previous temperature (e.g., ambient temperature).

According to embodiments of the present invention, supersaturated solutions make a simple and easily accessible form of three-dimensional (3D) sculpting possible. Advantageously, supersaturated solutions remain liquid at ambient temperature and solidify when activated. When additional solution contacts the existing solids, the solution also solidifies to augment the structure. By incorporating the supersaturated solution into a handheld device, a user may cause the solution to flow out of the device, activate the solution, and apply additional solution to further develop the three-dimensional structure. In this manner, a user may create a 3D structure simply by operating a handheld device at ambient temperature.

Embodiments of the present invention overcome a number of challenges posed by conventional 3D printing devices. First, embodiments no longer need the heating elements that were previously necessary to melt plastic or other substances. Therefore, embodiments simplify the design of the device, which reduces the cost, eliminates the power consumption and the need for a power source, and eliminates the risk associated with operating a device with a high temperature component.

Second, embodiments of the present invention are usable with negligible training or prior experience. Since a user simply needs to cause the solution to flow out of the 3D device and position the 3D device where the user wishes to deposit additional material, this 3D device requires little prior technical ability or investment (e.g., ability to use CAD software). Because of the device's ease of use, a broader base of individuals, such as children and hobbyists, may readily use the handheld 3D device.

Moreover, although supersaturated solutions have been used for other applications, none of these applications recognized that a supersaturation solution's ability to maintain its liquid state at ambient temperature and then solidify when activated would provide benefits and advantages. For example, embodiments of the present invention are more resistant to clogging than other prior art devices. In addition, the design is modular and able to accommodate a number of different solutions, opening the way for inclusion of dyes, scents, and other additives in the solutions. Details of illustrative embodiments are discussed below.

Figure 1:
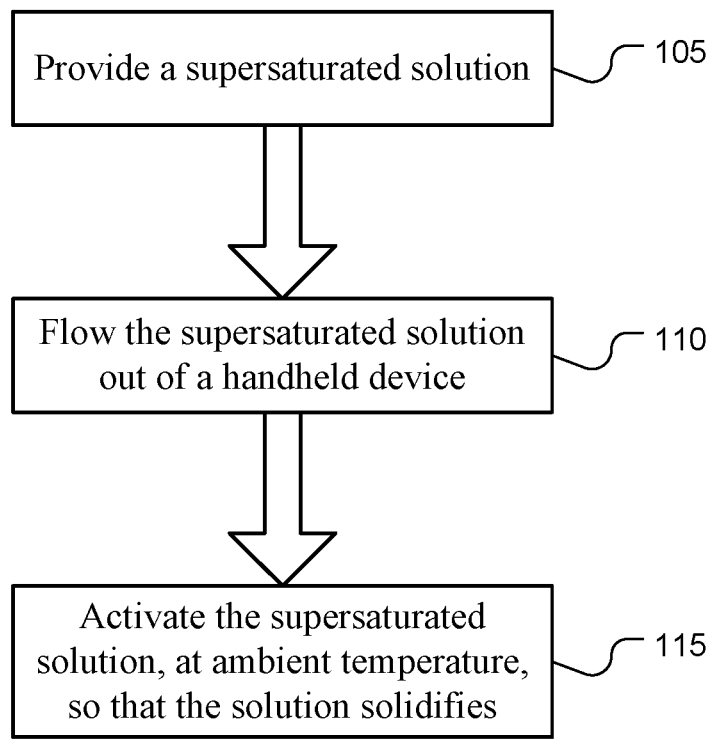
FIG. 1 depicts an exemplary flow diagram of a handheld three-dimensional (3D) sculpting process according to embodiments of the present invention.

FIG. 1 depicts an exemplary flow diagram of a handheld three-dimensional (3D) sculpting process using a supersaturated solution according to embodiments of the present invention. The process will be described with reference to the 3D crayon or handheld device 200 depicted in FIG. 2, which includes a malleable housing 205 that holds a chamber 210 containing the supersaturated solution 212. The chamber 210 also tapers to a channel 215, which includes an orifice 220.

The sculpting process includes providing a supersaturated solution 212 including a solid material dissolved in a solvent (step 105). The process then flows the supersaturated solution 212 out of the orifice 220 of the handheld device 200 and onto a substrate (step 110). The process then activates the supersaturated solution 212, at ambient temperature, so that the supersaturated solution 212 solidifies on the substrate (step 115).

The solute for the supersaturated solution 212 may be sodium sulfate heptahydrate, sodium acetate trihydrate, or sodium borate tetrahydrate. In many embodiments, the solvent may be water. In various embodiments, the solvent may be an alcohol, such as ethanol, isopropanol, or methanol. Various solutes may be used with any number of solvents, so long as the solute is capable of dissolving in the solvent.

Figure 2:
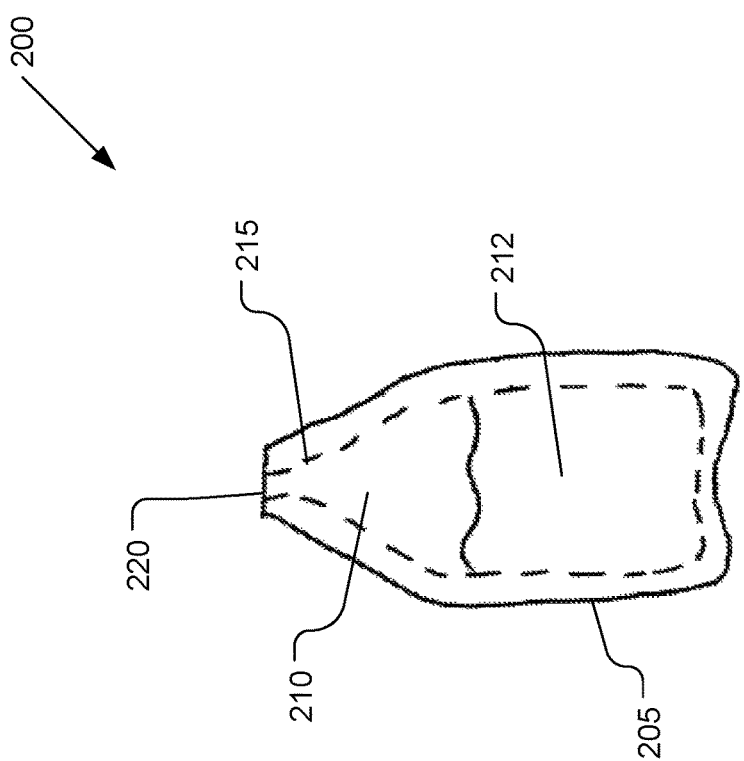
FIG. 2 depicts an exemplary handheld device according to embodiments of the present invention.

The chamber 210 of a handheld 3D device, such as the device 200 of FIG. 2, may hold the supersaturated solution 212 and maintain the solution in a liquid state. In some embodiments, the inner surface of the chamber 210 that contacts the supersaturated solution 212 may be free of nucleation sites. Smooth inner walls reduce the likelihood of the supersaturated solution 212 prematurely solidifying in the chamber 210. In some embodiments, the inner surface is smooth due to a coating material, e.g., silicone or a hydrophobic liquid. Other exemplary coating materials include nano-coatings, manganese oxide polystyrene, and oils (e.g., paraffins, vegetable oil, silicone oil). These materials are merely exemplary, as any material that reduces the surface roughness of the chamber 210 to prevent nucleation of the supersaturated solution on the inner surface may be used.

Figure 3:
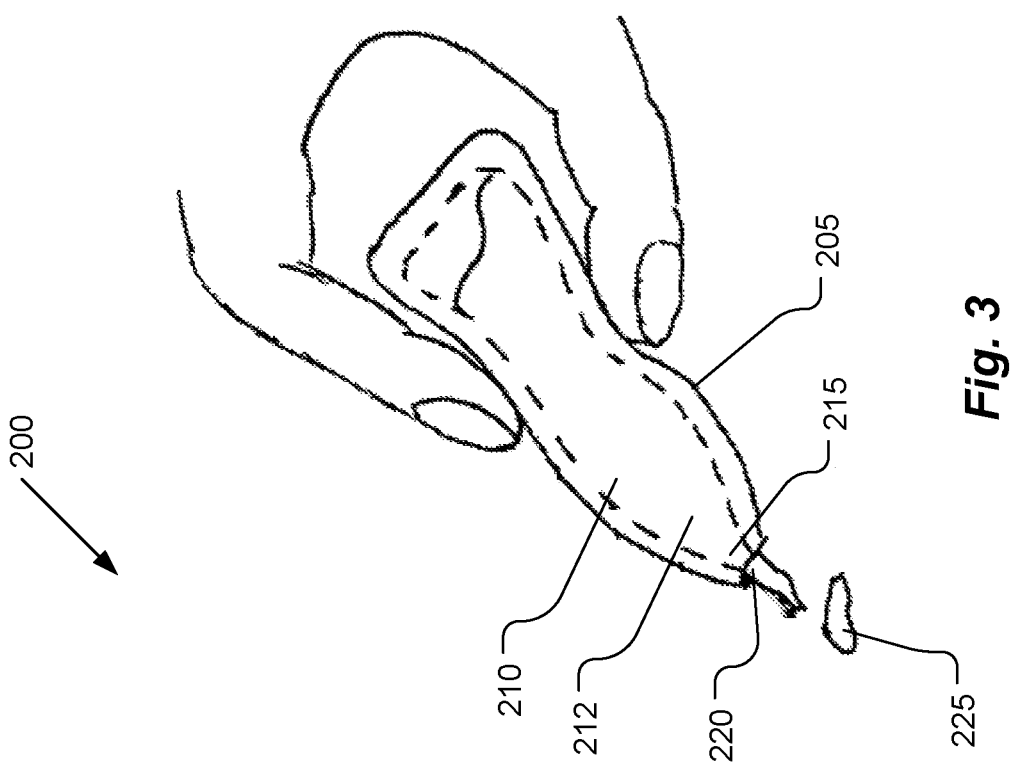
FIG. 3 depicts the use of the exemplary handheld device of FIG. 2 according to embodiments of the present invention.

FIG. 3 depicts the exemplary handheld 3D device of FIG. 2 in use. A user may apply pressure to the housing 205 of a 3D device 200 to propel the supersaturated solution 212 from the chamber 210 out of the orifice 220 of the device. The user may position the device 200 so that the pressure gradient within the chamber causes the solution to flow downwards. By applying sufficient force to the housing 205, the user may compel the liquid to exit through the orifice 220 regardless of the orientation of the 3D device 200. The housing 205 may be malleable and formed of thin, flexible material. For example, the housing 205 may be about 1.0 to about 2.0 millimeters thick and composed of low density polyethylene. When a user applies force to the housing 205, the housing 205 transfers the force to the chamber 210, and the chamber 210 propels the supersaturated solution through the channel 215 and out of the 3D device 200. The housing 205 may fully enclose the chamber 210 or only partially cover or surround the chamber 210. The solution is then activated so that the solution solidifies or partially solidifies. In this way, the user directs the solution 212 to flow out of the orifice 220 and onto a substrate in a desired shape.

The solution may be activated through contact with a seed crystal or material 225 on the substrate, such as dust, salt, or a piece of the solid that is dissolved in the supersaturated solution. For example, a user of the handheld 3D device may position the seed material 225 on a substrate, such as a table, and propel the solution onto the seed material. Upon contact with the seed material, the solution solidifies and provides a rigid structure upon which further solution may be added. In this case, the deposited structure acts as the seed material for the deposition of additional solution 212.

Alternatively, or in addition, the solution 212 may be activated by applying a sufficient force to the solution to transform the solution 212 into a solid. For example, after contacting the solution with a substrate, the user may agitate the deposited solution. In one embodiment, the user may rapidly move the device back and forth as solution flows from the chamber, and in another embodiment, the user may use an implement (e.g., a toothpick) to agitate the dispensed solution until it solidifies.

As described in more detail below in FIGS. 4-8, the 3D device may include a valve between the chamber and the orifice of the device. The valve may be closed to prevent the solution from flowing out of the device and opened to allow the solution to flow out of the device when held in an upright position. In some embodiments, the valve may be adjustable in order to regulate the rate at which solution flows out of the 3D device. For example, the valve may be opened more to increase the rate of flow and closed or partially closed to slow the rate of flow. In some embodiments, the user may regulate the valve to ensure that the 3D device propels the solution toward the substrate with sufficient force to activate the solution when it contacts the substrate.

FIGS. 4-8 depict various exemplary embodiments of handheld 3D devices, with different valve configurations for controlling the flow of supersaturated solution and for equalizing pressure in the chamber. All of the embodiments depicted herein include a chamber 210 that contains the supersaturated solution 212 and a housing 205 that holds the chamber 210. Each embodiment will be described with respect to the features not depicted in previous embodiments.

Figure 4:
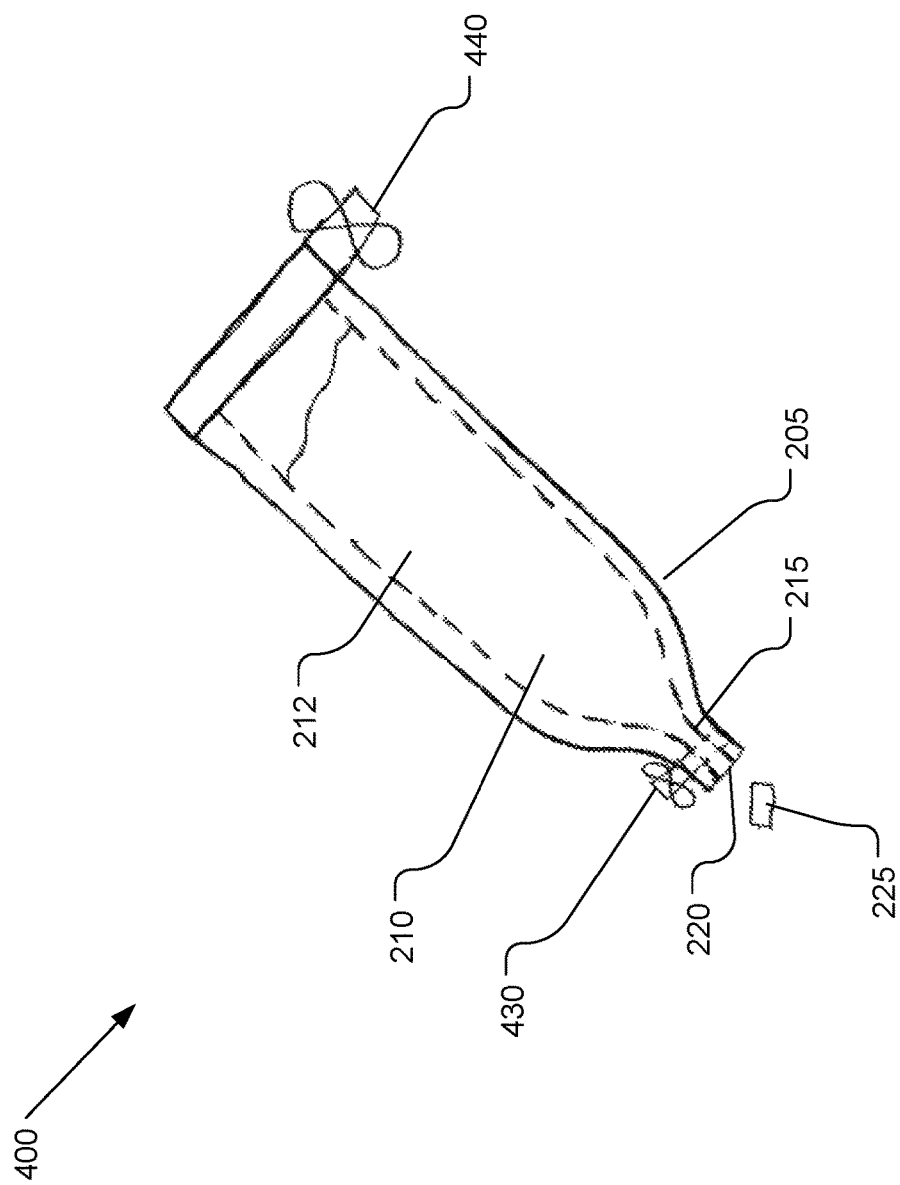
FIGS. 4-8 depict various exemplary embodiments of handheld 3D devices with different valve configurations for controlling the flow of supersaturated solution and for equalizing pressure in the chamber according to embodiments of the present invention.

In FIG. 4, the 3D device 400 includes a liquid release valve 430 and a pressure equalizer valve 440. The liquid release valve 430 is disposed between the chamber 210 that holds the supersaturated solution 212 and the orifice 220 of the 3D device 400. Depending on whether the liquid release valve 430 is open or closed, the liquid release valve 430 allows or prevents the solution 212 from flowing out of the device 400 through the channel 215. The pressure equalizer valve 440 is connected to the housing 205. When the pressure equalizer valve 440 is closed, the pressure equalizer valve 440 prevents the solution 212 from flowing out of the chamber 210, even if the liquid release valve 430 is open.

Figure 5A:
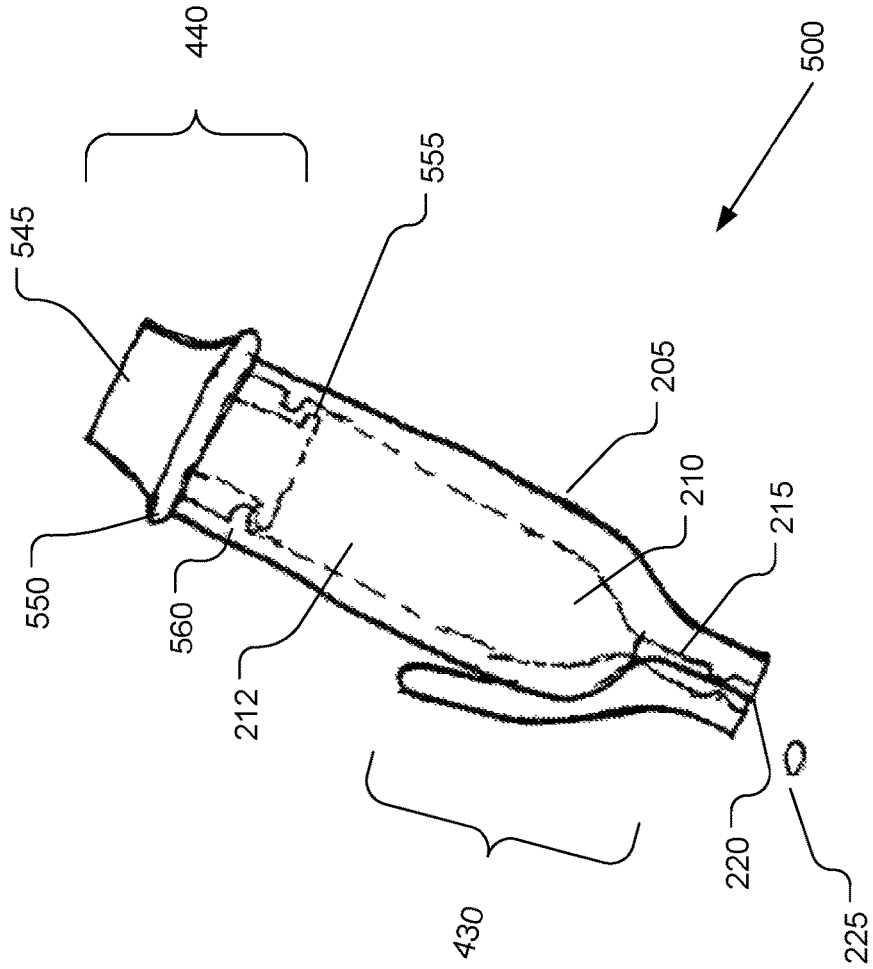

In FIGS. 5A, 5B, 6A, and 6B, the 3D device depicts alternate embodiments for the liquid release valve 430 and the pressure equalizer valve 440. The pressure equalizer valve 440 includes a grip 545 with a seal 550 and ridges 555, and further ridges 560 located on the inside of the chamber 210. FIG. 5A depicts the closed position of the pressure equalizer valve 440. Here, the ridges 555 of the grip 545 have been pushed past the ridges 560 of the chamber 210, and in this closed position, the seal 550 is flush against the housing 205 of the 3D device 500. Even if the liquid release valve 430 were opened, the supersaturated solution 212 would not flow out of the chamber 210.

Figure 5B:
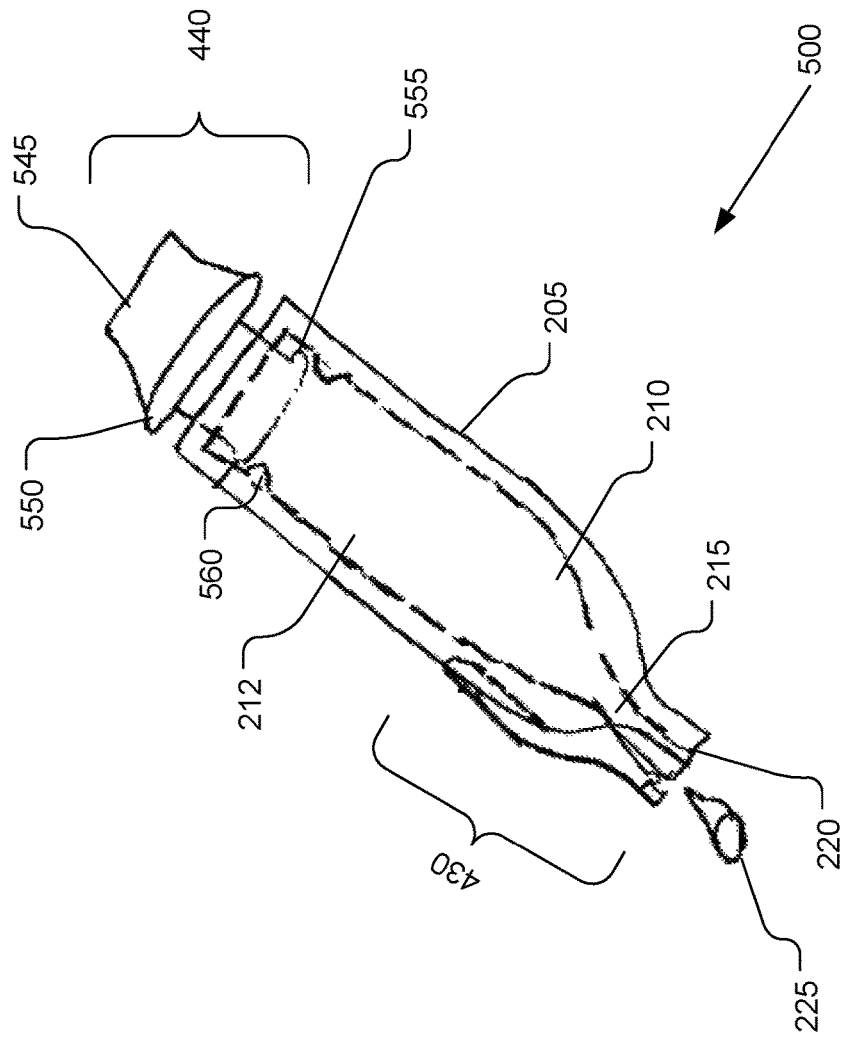

When a user pulls on the grip 545, its ridges 555 deform and push past the ridges 560 in the chamber 210, as depicted in FIG. 5B. This movement releases pressure from the seal 210 and thereby opens the chamber 210 to surrounding pressure.

Figure 6A:
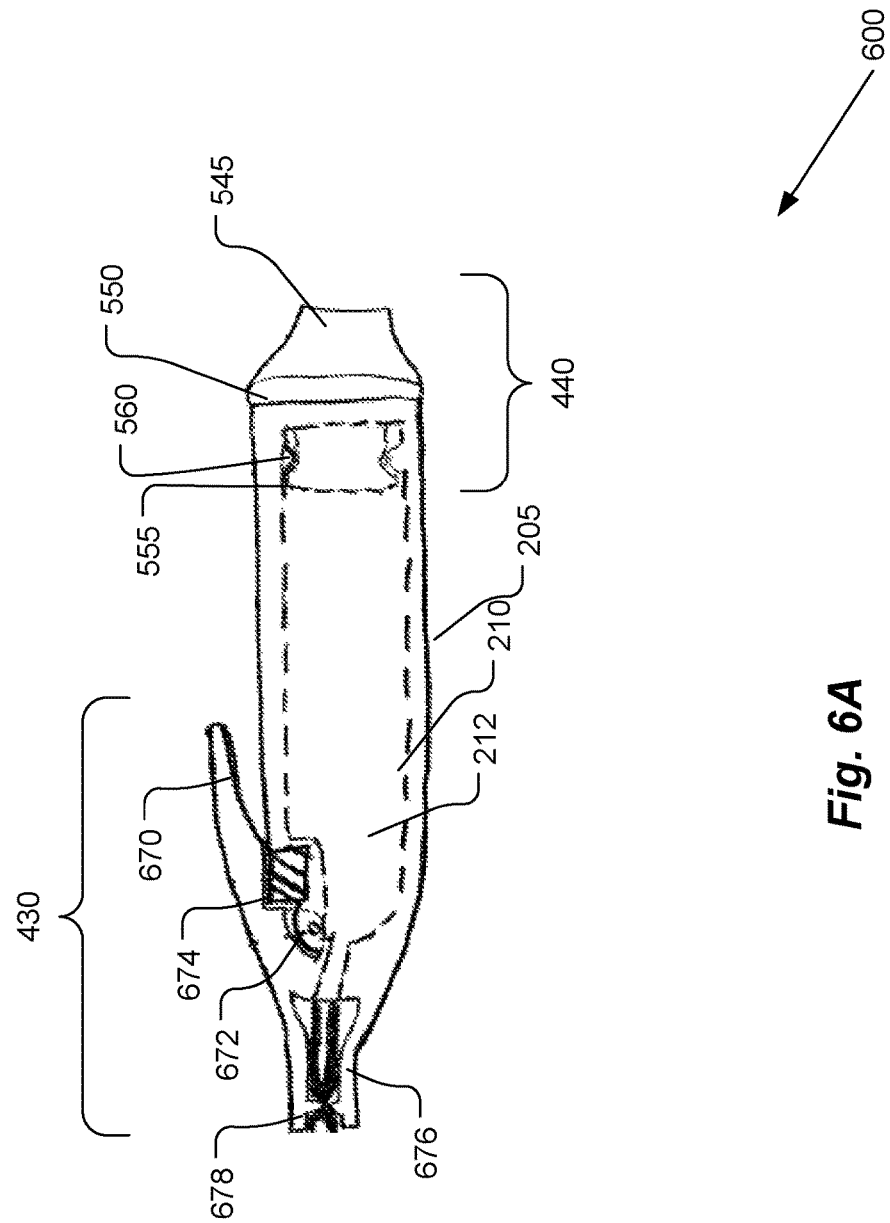
Figure 6B:
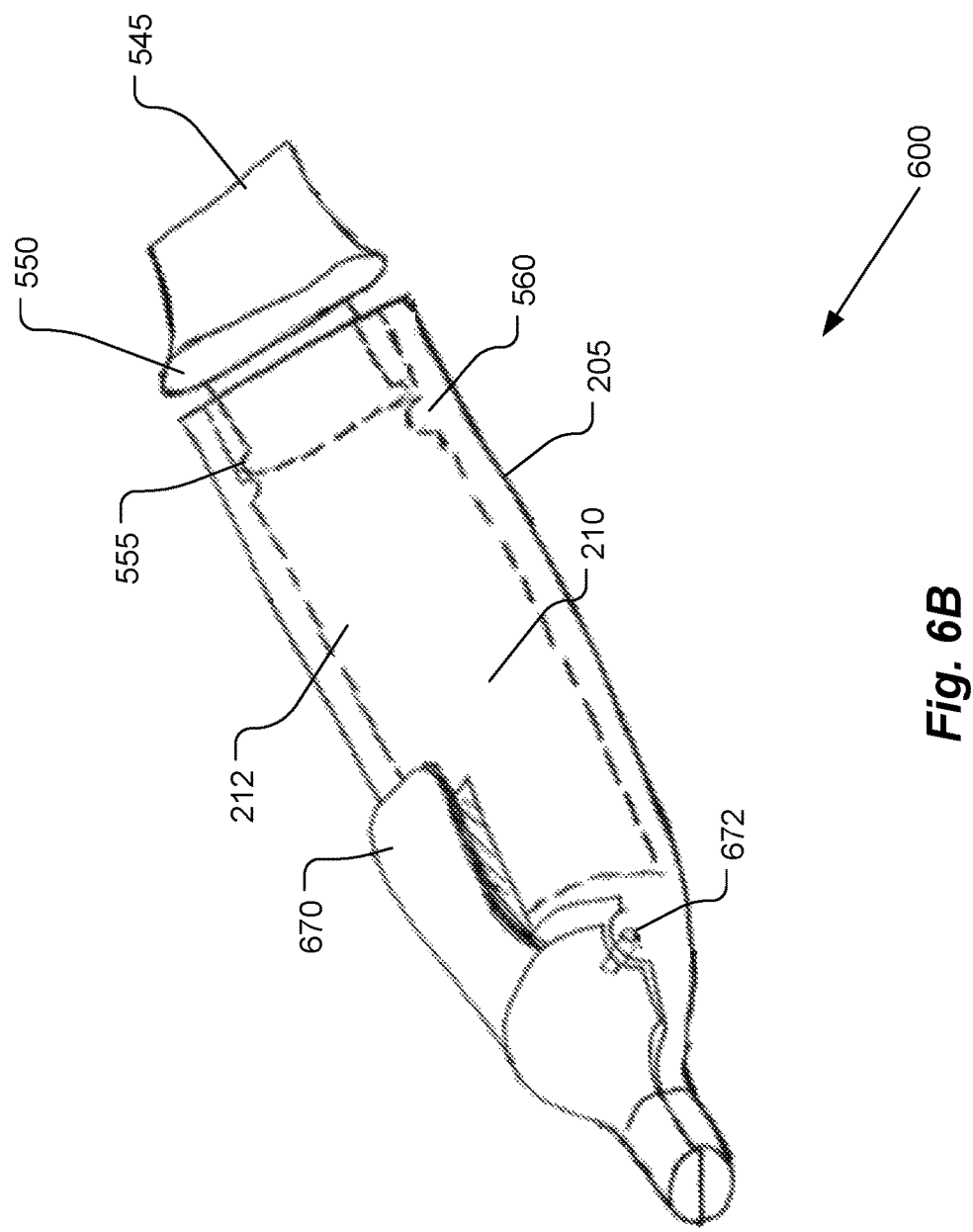

FIGS. 6A and 6B depict the liquid release valve 430 used in combination with the pressure equalizer valve 440 of FIGS. 5A and 5B. The liquid release valve 430 includes a lever 670, a pivot 672, a compressible component 674, a tube 676, e.g., made of heat-resistant material, and pinching teeth 678. The tube 676 is inserted in the channel 215 between the chamber 210 and the exterior of the 3D device 600, and the pinching teeth 678 press opposite walls of the tube 676 together to occlude the channel 215. Once the pressure equalizer valve 440 is open, a user may press on the lever 670 so that the lever 670 rotates around the pivot 672. As the lever 670 presses into the compressible component 674, one side of the pinching teeth 678 is released from the opposite side of the pinching teeth 678 to create an opening in the channel 215. As a result, the supersaturated solution 212 may flow from the chamber 210, through the channel 215, and out of the 3D device 600.

When the user releases the lever 670, the compressible component 674 restores the lever 670 to its original position. Consequently, the pinching teeth 678 return to their positions, occluding the channel 215 to prevent further supersaturated solution 212 from flowing.

In various embodiments, the compressible component 674 may include any non-metallic compressible material. For example, the component 674 may be a rubber block, a plastic spring, or an elastic band. In some embodiments, the lever 670, pivot 672, and pinching teeth 678 include any material, such as thermoplastic, that may contact a high temperature liquid without melting. For example, the components may include a thermoplastic that may withstand boiling water. In some embodiments, the lever 670, pivot 672, and pinching teeth 678 are separate components, and in other embodiments, the components are integrally formed. In many embodiments, the tube 674 includes a compressible material. For example, the tube 676 may include silicone or Tygon®.

Figure 7:
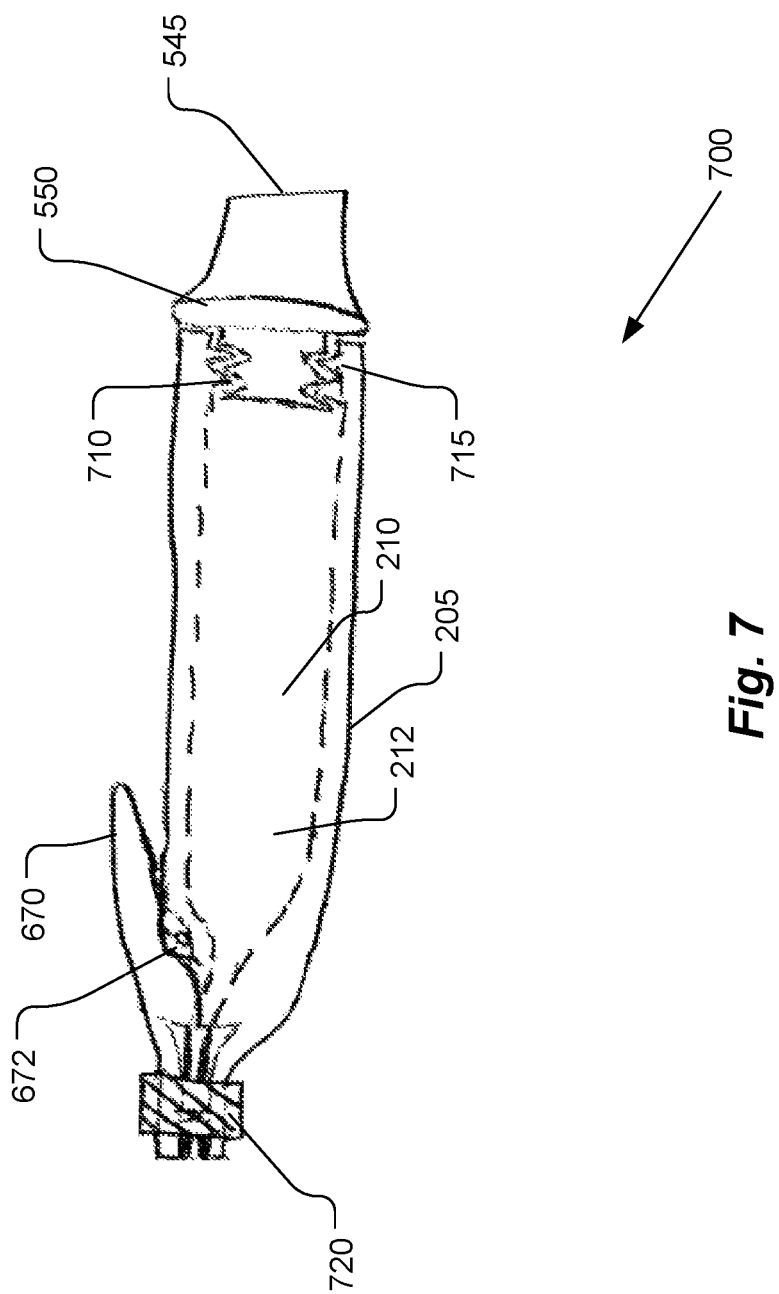

In FIG. 7, the 3D device 700 depicts further alternate embodiments for the liquid release valve 430 and a pressure equalizer valve 440. In this embodiment, the pressure equalizer valve 440 includes a grip 545 with a seal 550 and threads 710, and further threads 715 located on the inside of the chamber 210. Nevertheless, the pressure equalizer valve 440 is operated in the same manner as described with respect to the pressure equalizer valve 440 of FIG. 5. As for the liquid release valve 430, the valve 430 includes the lever 670, pivot 672, tube 676, and pinching teeth 678 as depicted in FIGS. 6A and 6B. The valve 430 further includes an elastic band 720, which forms the same function as the compressible component 674 in FIGS. 6A and 6B.

Figure 8:
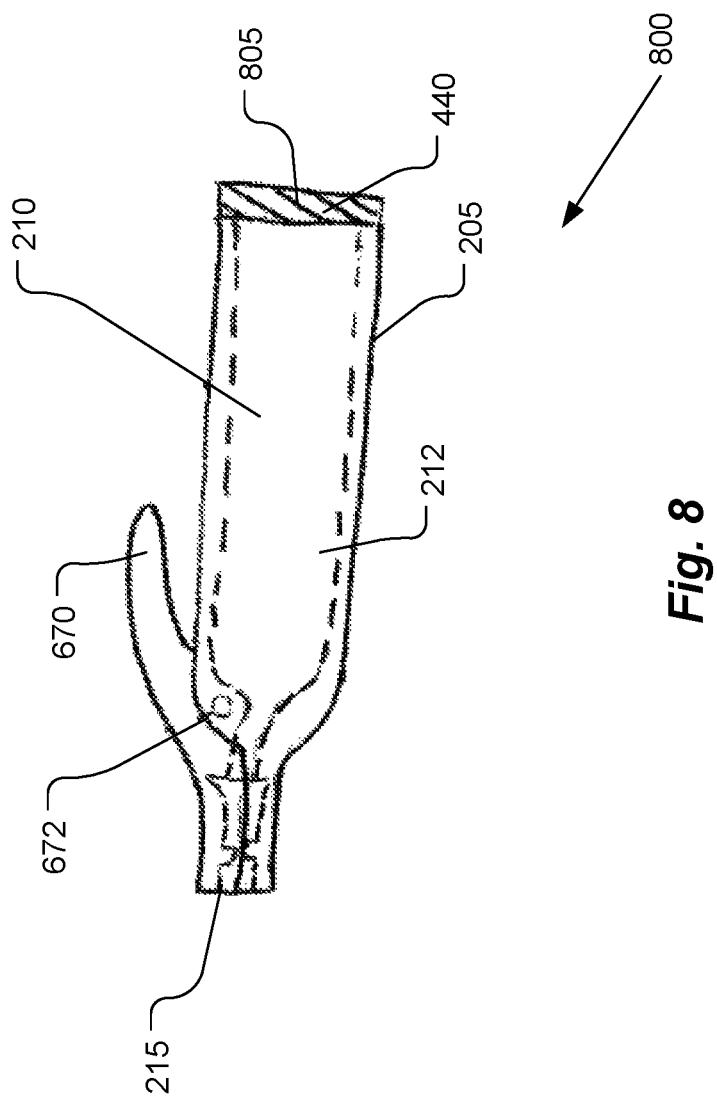

In FIG. 8, the 3D device 800 depicts another prospective embodiment for the pressure equalizer valve 440. In this embodiment, the pressure equalizer valve 440 is a semipermeable membrane 805 that allows air, but not water, to pass through. In this manner, the valve 440 constantly maintains the chamber 210 at the same pressure as the ambient atmosphere, and the supersaturated solution 212 may flow through the channel 215 whenever a user operates the liquid release valve 430, i.e., the lever 670.

Figure 9:
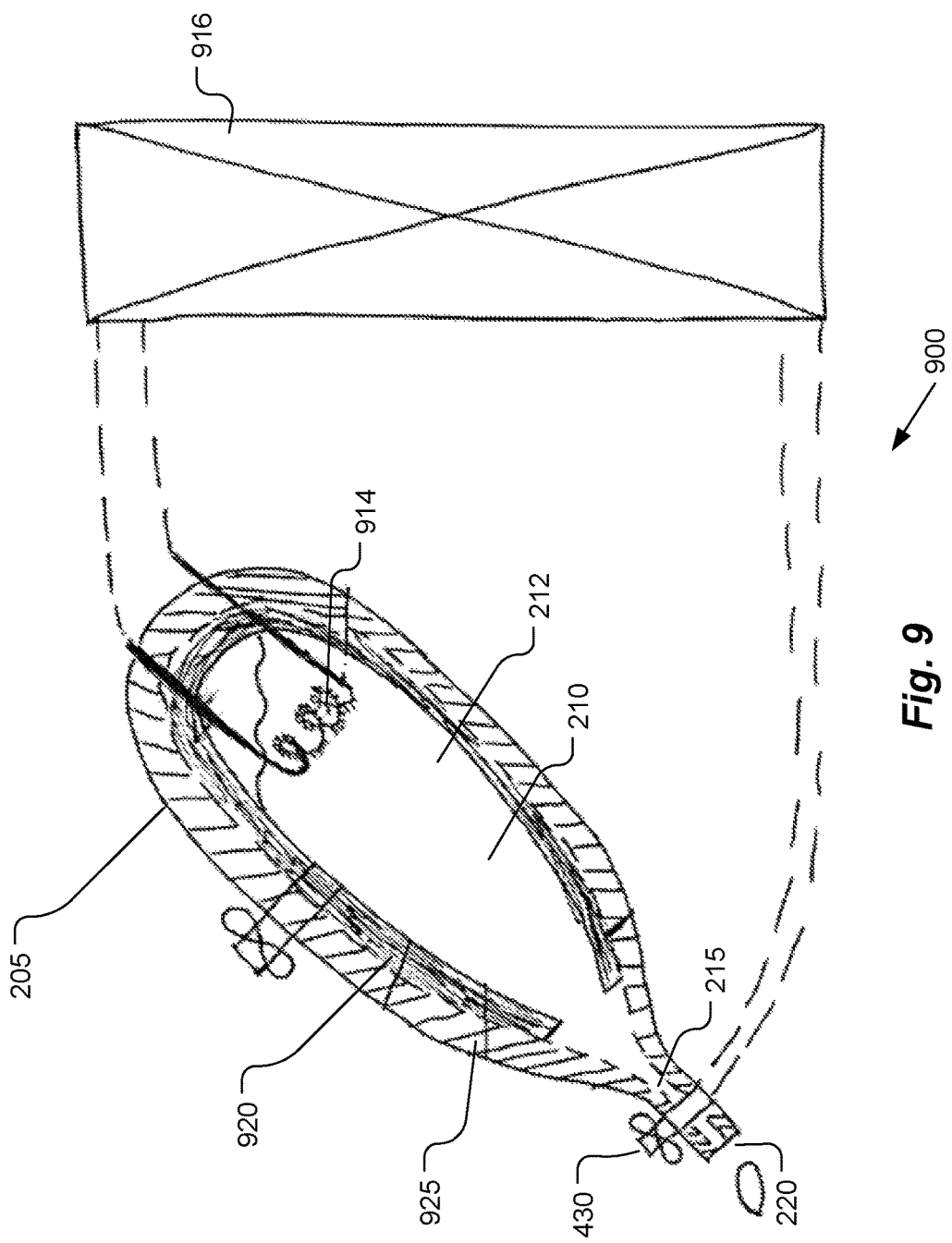
FIG. 9 depicts an exemplary handheld 3D device with a heater for melting solidified supersaturated solution in the chamber according to embodiments of the present invention.

In FIG. 9, the 3D device 900 is configured to heat the supersaturated solution 212 if the solution has solidified within the chamber 210. If the solution 212 is activated prematurely, the solidified solution may clog the channel 215 and orifice 220 of the 3D device 900, thereby preventing further dispensing of the solution 212. The device 900 includes a heating element 914 coupled to a power source 916 for heating the supersaturated solution 212. Thus, should the supersaturated solution 212 solidify, the heating element 914 may melt the solids to render the 3D device 900 usable again.

Exemplary heating elements 914 include coiled joule heaters (e.g., power resistors) and heat exchangers, although other types of heating elements may be used. The power source 916 may include batteries or a wall outlet. In some embodiments, the power source 916 also includes components to regulate the power flowing into the heating element 914. Alternatively, if the device 900 uses a heat exchanger, the power source 916 may regulate the power flowing to a coolant.

In some embodiments, the chamber 210 is lined with a thermal diffuser 920 that aids in melting the solid form of the saturated solution 212. The thermal diffuser 920 may coat the inner surface of the chamber 210, or coat only a part of the inner surface. In some embodiments, the thermal diffuser 920 includes fins (not shown) to enhance heat dissipation. The thermal diffuser 920 may include metal, such as copper or aluminum, to dissipate heat throughout the chamber 210. The device 900 may include an insulator 925 to protect a user from the heat being applied in the chamber 210.

In some embodiments, the power source 916 is coupled to the liquid release valve 430, which may cool the supersaturated solution 212 as the liquid passes through the channel 215. Thus, while the heating element 914 maintains the solution 212 at an elevated temperature, the liquid release valve 430 may cool the solution 212 to ambient temperature or lower so that the solution solidifies as it exits the device 900. In some embodiments, the liquid release valve 430 includes a heat exchange, such as a peltier cooler.

The handheld 3D devices described herein may be housed in structures with form factors similar to a scribing utensil, such as a pen. Alternatively, the devices may be housed in simple depositing devices, such as squeeze bottles. However, any form factor conducive to being held in a user's hand may be used.

In this embodiment, the housing 205 includes a thermoplastic material, a polytetrafluoroethylene material, a low density polyethylene, or a combination thereof. However, this housing 205, and any other housing described herein, may include any material that can contain a high temperature material without melting. For example, the housing may include any material that may be subject to boiling water (e.g., 100° C.) without melting.

In some embodiments, the 3D device may not have an orifice 220 until a user removes part of the housing 205. For example, the user may cut away part of the device with a pair of scissors to expose the channel 215 and thus create the orifice 220. In this manner, removing part of the housing 205 creates a pathway from the chamber 210 to the exterior.

The supersaturated solution 212 may include additional solutes that do not promote solidification of the solution, but which provide desirable properties for the 3D structure created from the solution. For example, the solution 212 may contain dyes (e.g., water or oil-based food dyes), fluorescents (e.g., diphenyl oxalate or hydrogen peroxide mixtures), scents (e.g., essential oils such as limonene and carvone), and/or catalysts (e.g., sodium hydroxide).

Similar processes may be used to create different supersaturated solutions. In many embodiments, the solution must be heated gradually to avoid boiling away solvent and consequently, changing the concentration of the solution.

In various embodiments, the handheld 3D devices may be fabricated from materials that enable a user to heat the device safely and melt supersaturated solution that has solidified within the chamber. When the device includes thermoplastic materials, by way of example, a user may bring a pot of water to a boil and submerse the device in the boiling water. In another example, when the device does not contain any metal, the user may place the device in a microwave oven to melt the supersaturated solution.

To further illustrate embodiments of the present invention, the following example is provided. However, embodiments of the present invention are not to be construed as being limited thereto.

EXAMPLE

Inks were made for the 3D device using a supersaturated solution of sodium acetate trihydrate, using water as the solvent. 10-1000 grams of sodium acetate trihydrate per 1 mL of water was mixed together at room temperature. The mixture should be a liquid phase for extended periods of time and spontaneous crystallization should be avoided. After the solution was mixed, the mixture was heated to a temperature of about 60-80 degrees celsius. The solution may be heated gently with a microwave (~100 W). Care must be taken to heat the mixture slowly so that water is not boiled away from the mixture, changing the concentration. The supersaturated solution was produced when the mixture was clear and transparent, indicating that the solute was fully dissolved. Colorants and water-based dyes can be added to the supersaturated solution as desired. The supersaturated solution was poured into a dispenser while the solution was still hot/warm. The solution and container was allowed to cool back down to room temperature.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of depositing dissoluble solid material onto a substrate, the method comprising:
   providing a supersaturated solution including the solid material dissolved in a solvent;
   flowing the supersaturated solution out of an orifice of a handheld device and onto the substrate; and
   activating the supersaturated solution, at ambient temperature, so that the supersaturated solution solidifies.

2. The method of claim 1, wherein activating the supersaturated solution comprises:
   providing a nucleation site for the supersaturated solution; and
   contacting the nucleation site with the supersaturated solution.

3. The method of claim 1, wherein activating the supersaturated solution comprises:

contacting the supersaturated solution with a seed material.

4. The method of claim 1, wherein activating the supersaturated solution comprises:
   contacting the supersaturated solution with dust, salt, or a piece of the solid material.

5. The method of claim 1, wherein activating the supersaturated solution comprises:
   applying a force to the supersaturated solution.

6. The method of claim 1, wherein flowing the supersaturated solution out of the orifice of the handheld device comprises:
   opening a valve between a chamber containing the supersaturated solution and the orifice of the handheld device; and
   propelling the supersaturated solution from the chamber through the orifice.

7. The method of claim 6, wherein propelling the supersaturated solution comprises:
   applying a force to a housing of the handheld device.

8. The method of claim 1, wherein the handheld device includes a chamber containing the supersaturated solution, the method further comprising:
   applying heat to the chamber to melt solidified supersaturated solution.

9. A handheld device for depositing dissoluble solid material onto a substrate, the device comprising:
   a chamber configured (1) to contain a supersaturated solution that solidifies when activated, and (2) to maintain the supersaturated solution as a liquid in the chamber; and
   a housing that holds the chamber, the housing including an orifice through which the supersaturated solution flows at ambient temperature.

10. The handheld device of claim 9, wherein the chamber includes a smooth inner surface that maintains the supersaturated solution as a liquid.

11. The handheld device of claim 10, wherein the smooth inner surface includes polystyrene, acrylonitrile butadiene styrene, polypropylene, silicone, a hydrophobic liquid, or a combination thereof.

12. The handheld device of claim 9, wherein the housing comprises a thin, flexible material so that pressure applied to the housing propels the supersaturated solution in the chamber to flow through the orifice.

13. The handheld device of claim 9, wherein the housing comprises a thermoplastic material, a polytetrafluoroethylene material, a low density polyethylene, or a combination thereof.

14. The handheld device of claim 9, wherein the housing is configured as a scribing device.

15. The handheld device of claim 9, further comprising:
   a valve located between the chamber and the orifice of the handheld device, wherein the valve is configured to control the rate of flow of the supersaturated solution from the chamber through the orifice.

16. The handheld device of claim 15, wherein the valve includes a lever and a pivot.

17. The handheld device of claim 9, further comprising:
   a heat source configured to apply heat to the chamber for melting solidified supersaturated solution; and
   a cooling system, proximate to the orifice of the housing, that cools the supersaturated solution to ambient temperature as the solution flows out of the housing.

18. The handheld device of claim 17, wherein the chamber is coated with a thermally conductive material.

19. The handheld device of claim 18, wherein the thermally conductive material is a metal.

20. The handheld device of claim 9, further comprising:
   a pressure valve to regulate the pressure of the supersaturated solution within the chamber.

* * * * *